(12) United States Patent
Strange

(10) Patent No.: US 6,688,627 B1
(45) Date of Patent: Feb. 10, 2004

(54) BICYCLE WHICH CONVERTS TO A CHAIR

(76) Inventor: Ruowei Z. T. Strange, 3413 Trail Ridge Rd., Louisville, KY (US) 40241

( * ) Notice: Subject to any disclaimer, the term of this patent is extended or adjusted under 35 U.S.C. 154(b) by 0 days.

(21) Appl. No.: 10/121,361

(22) Filed: Apr. 12, 2002

Related U.S. Application Data
(60) Provisional application No. 60/284,022, filed on Apr. 16, 2001.

(51) Int. Cl.[7] ............................................... B62K 15/00
(52) U.S. Cl. ..................................... 280/278; 280/415.1
(58) Field of Search ................................. 280/278, 287, 280/415.1

(56) References Cited

U.S. PATENT DOCUMENTS

| | | | |
|---|---|---|---|
| 2,619,364 A | | 11/1952 | Carson |
| 3,623,749 A | | 11/1971 | Jensen |
| 3,791,672 A | * | 2/1974 | Pera ........................ 280/287 |
| 3,854,755 A | | 12/1974 | Tang |
| 3,865,403 A | * | 2/1975 | Majerus ..................... 280/287 |
| 4,029,326 A | | 6/1977 | Blow, Jr. |
| 4,113,271 A | | 9/1978 | Furia |
| 4,252,335 A | | 2/1981 | Brenner |
| 4,462,606 A | | 7/1984 | Hon |
| 4,491,337 A | | 1/1985 | Zuck |
| 4,611,818 A | | 9/1986 | Cammarata |
| 4,767,130 A | * | 8/1988 | Fu-Chao ..................... 280/202 |
| 4,775,182 A | | 10/1988 | Von Hoffman |
| 5,066,032 A | | 11/1991 | Van Vooren et al. |
| 5,324,060 A | | 6/1994 | Van Vooren et al. |
| 5,360,225 A | * | 11/1994 | Chen ........................ 280/278 |
| 5,398,955 A | * | 3/1995 | Yeh .......................... 280/287 |
| 5,400,676 A | | 3/1995 | Kao |
| 5,586,652 A | | 12/1996 | Smilanick |
| 5,678,458 A | | 10/1997 | Kao |
| 5,836,602 A | | 11/1998 | Wang |
| 5,887,882 A | | 3/1999 | Atchison |
| 5,921,571 A | | 7/1999 | Bell |
| 6,058,800 A | | 5/2000 | Giard |
| 6,135,668 A | | 10/2000 | Lin |
| 6,293,575 B1 | | 9/2001 | Burrows et al. |
| 6,336,649 B1 | | 1/2002 | Lin |
| 6,341,791 B1 | | 1/2002 | Cannon, Sr. |
| 6,425,598 B2 | * | 7/2002 | Murayama .................. 280/278 |
| 2002/0167151 A1 | * | 11/2002 | Tseng ........................ 280/287 |

* cited by examiner

Primary Examiner—Kevin Hurley
(74) Attorney, Agent, or Firm—Camoriano and Associates; Theresa Fritz Camoriano; Guillermo Camoriano

(57) ABSTRACT

A bicycle, which readily converts to a chair, has front and rear joints to allow the front and rear wheel assemblies of the bicycle to move out of the plane of the bicycle frame to form a substantially U-shaped frame onto which a seat fabric may be stretched to form a sling chair. The fabric may be stowed in a roller tube and may be deployed in a manner similar to that of a retractable window shade. Retractable stands may be deployed under the wheels to provide the legs of the chair.

11 Claims, 16 Drawing Sheets

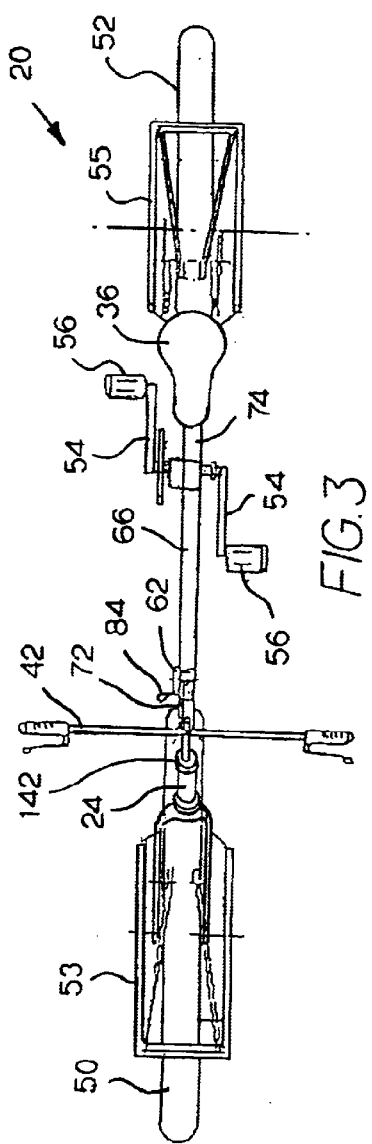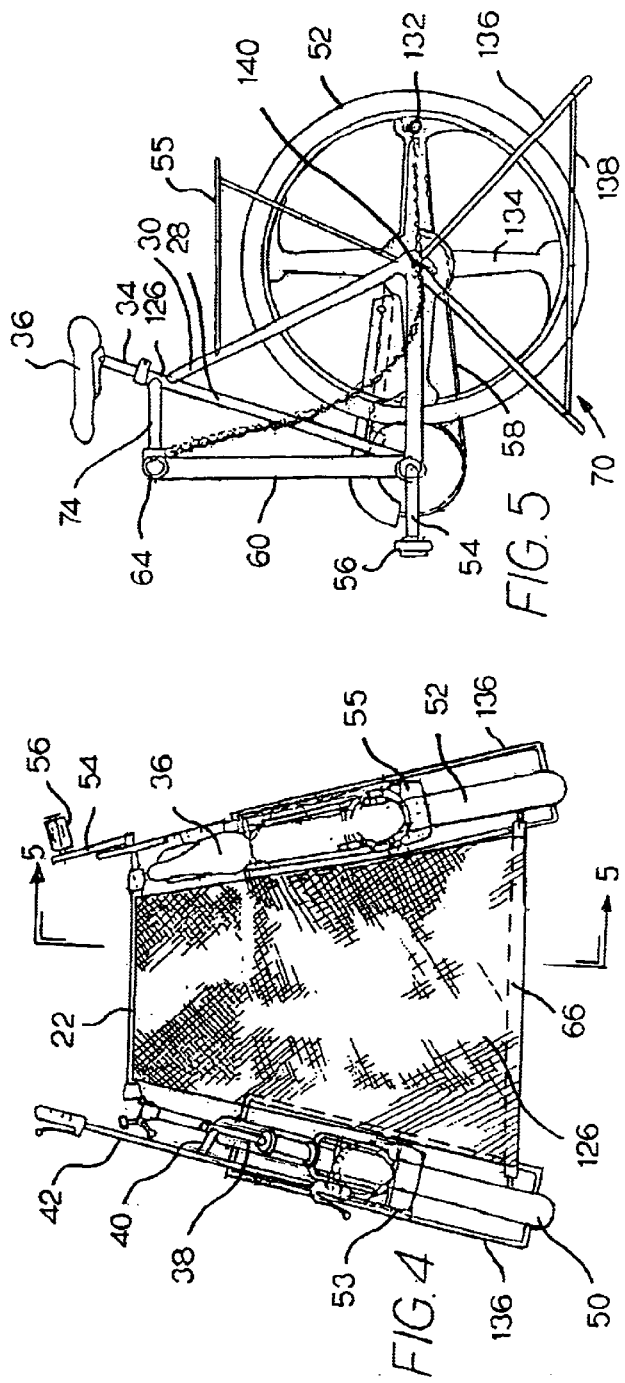

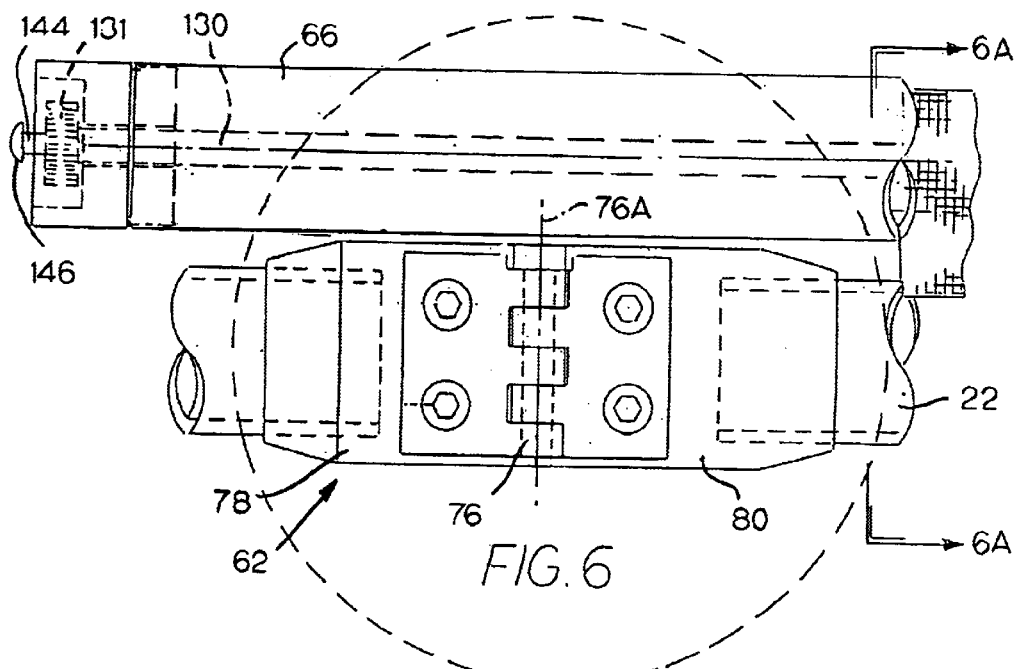
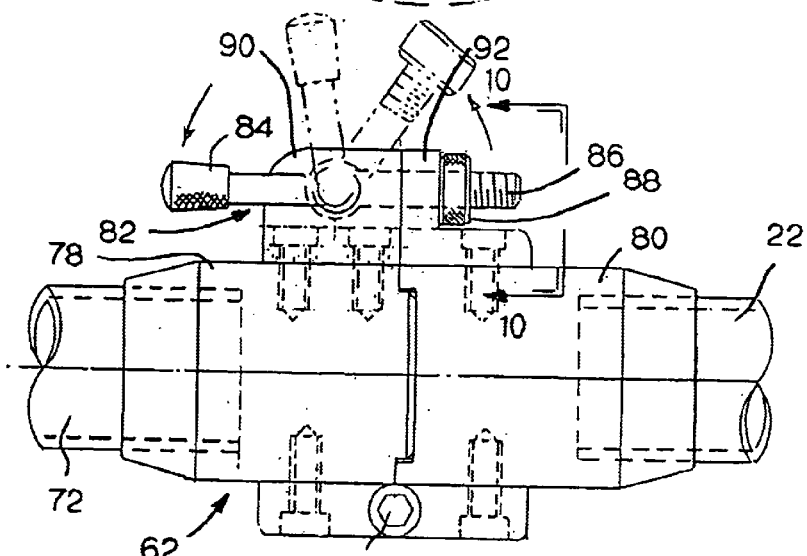
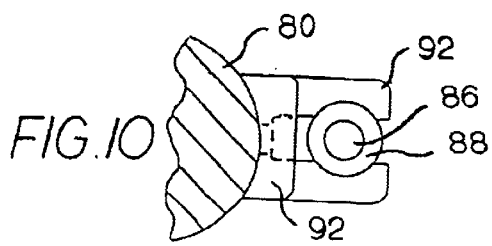
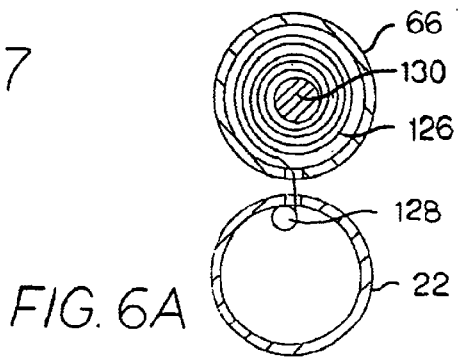

US 6,688,627 B1

BICYCLE WHICH CONVERTS TO A CHAIR

This application claims priority from U. S. Provisional Application Ser. No. 60/284,022 filed on Apr. 16, 2001, which is hereby incorporated by reference.

BACKGROUND OF THE INVENTION

The present invention relates to a bicycle which readily converts to a chair.

SUMMARY OF THE INVENTION

The present invention provides a bicycle with the normal features, plus it can be converted to form a chair. While in the bicycle configuration, the wheels are coplanar with the bicycle's frame. To convert the bicycle to a folding chair, the wheels are rotated out of their coplanar positions until they are nearly perpendicular to the rest of the frame. The wheel assemblies then serve as the sides of the chair, and a flexible chair material is extended and is supported by the bicycle frame to form a seat.

BRIEF DESCRIPTION OF THE DRAWINGS

FIG. 3 is a plan view of the bicycle of FIG. 1;

FIG. 4 is a plan view of the chair of FIG. 2;

FIG. 5 is a sectional view taken along line 5—5 of FIG. 4;

FIG. 6 is an enlarged, broken-away, and partially in cross-section detail of the front hinge of FIG. 1;

FIG. 6A is a section view taken along line 6A—6A of FIG. 6;

FIG. 7 is plan view of the lower tube of FIG. 6 (the top tube has been removed for clarity), showing the hinge in locked closed position and, in phantom, the position of the latching mechanism to unlatch the hinge;

FIG. 10 is a view along line 10—10 of FIG. 7;

DESCRIPTION OF THE PREFERRED EMBODIMENTS

Figure 1:
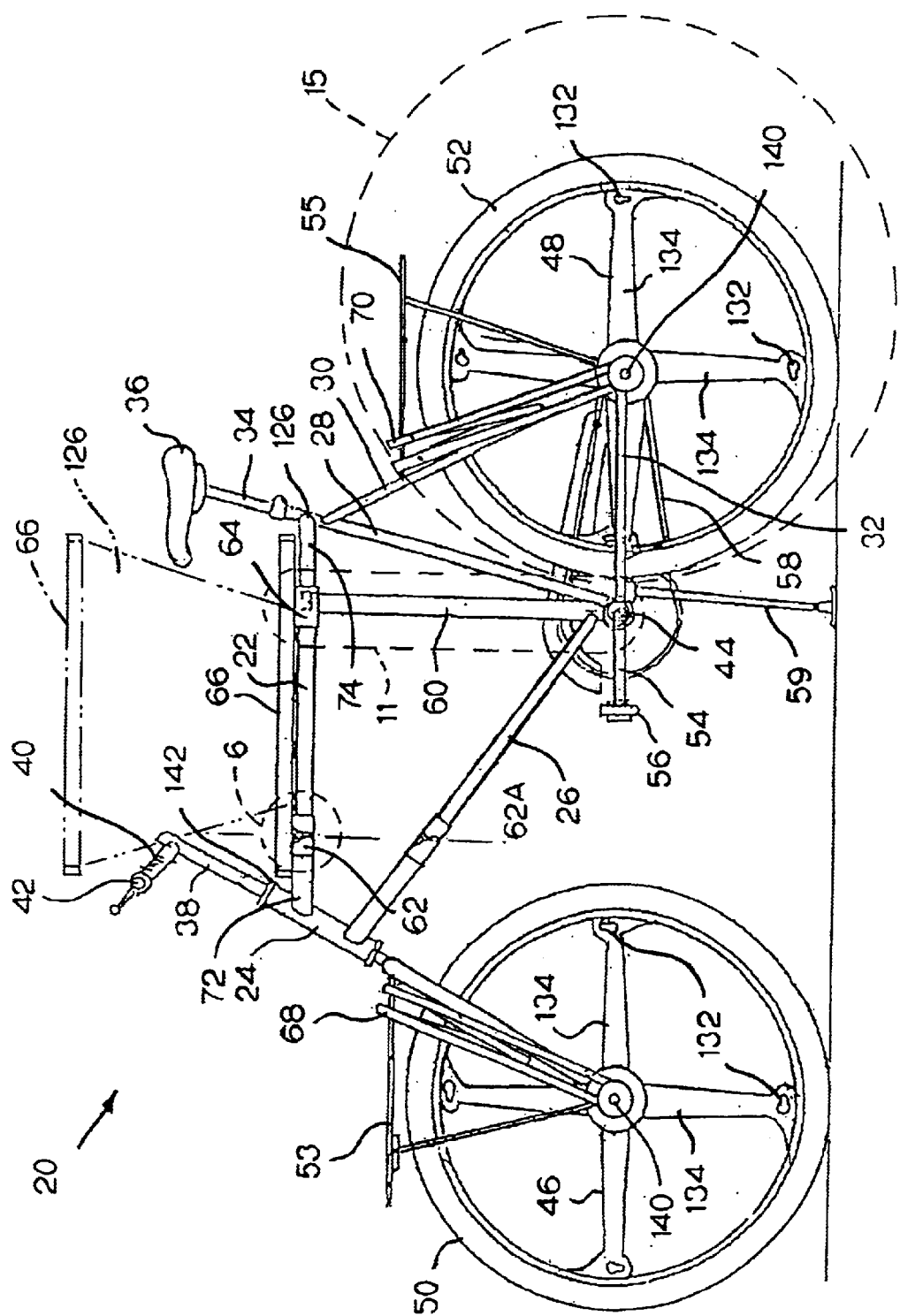
FIG. 1 is a side view of a first embodiment of a bicycle made in accordance with the present invention, with a fabric storage tube shown in its stowed position in solid lines and in an extended position in phantom.

FIGS. 1 and 3 depict a bicycle 20 made in accordance with the present invention. This bicycle 20 has the usual components of a bicycle, such as a frame including a top bar 22, a fork tube 24, a down tube 26, a seat tube 28, a top stay 30, a chain stay 32, a seat post 34, a seat 36, a handle bar post 38, a goose bar 40, handle bars 42, a bottom bracket 44, front and rear wheels 46, 48 and tires 50, 52 respectively, a front carrier rack 53, rear carrier rack 55, crank 54, pedals 56, a chain drive 58, and a kick stand 59. All of these components are arranged and interconnected as in a traditional bicycle, as is well known in the art. The bicycle 20 also includes items not typically found in a traditional bicycle, including a swivel tube 60, front pivotal joints 62, 62A, rear pivotal joint 64, roller tube 66, front and rear A-frame stands 68, 70, front top tube connector 72, and rear top tube connector 74, the arrangement and purpose of which will be discussed shortly.

Figure 2:
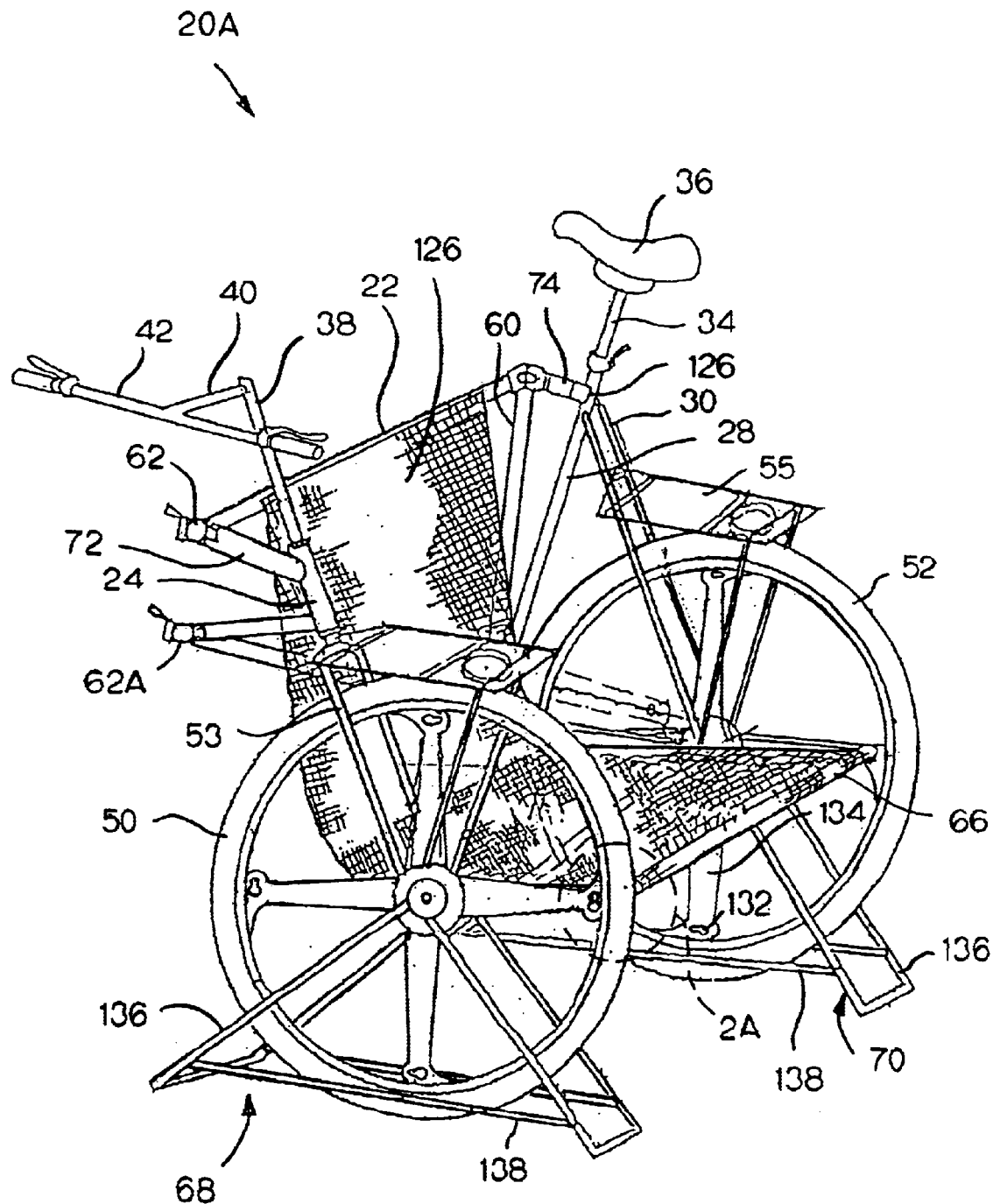
FIG. 2 is a perspective view of the bicycle of FIG. 1 but shown in the chair configuration.

In order to convert the bicycle shown in FIGS. 1 and 3 into the chair shown in FIGS. 2, 4, and 5, the frame is bent at the front and rear pivotal joints 62, 62A, 64 in order to pivot the wheels out of the plane of the main portion of the frame 22. In a preferred embodiment, the wheels pivot approximately 75 degrees from their coplanar position in the bicycle configuration 20 to the chair configuration 20A. FIGS. 6, 7, 8, and 9 illustrate the front pivotal joint 62 which connects the front top tube connector 72 to the top bar 22. When the joint 62 is in the locked position (see FIG. 7), the front top tube connector 72 and top bar 22 are connected end-to-end in a rigid position in axial alignment. The joint 62 also allows the top tube connector 72 to swivel relative to the top bar 22 around a pivot axis 76A (See FIG. 6) defined by the pivot hinge 76.

Figure 9:
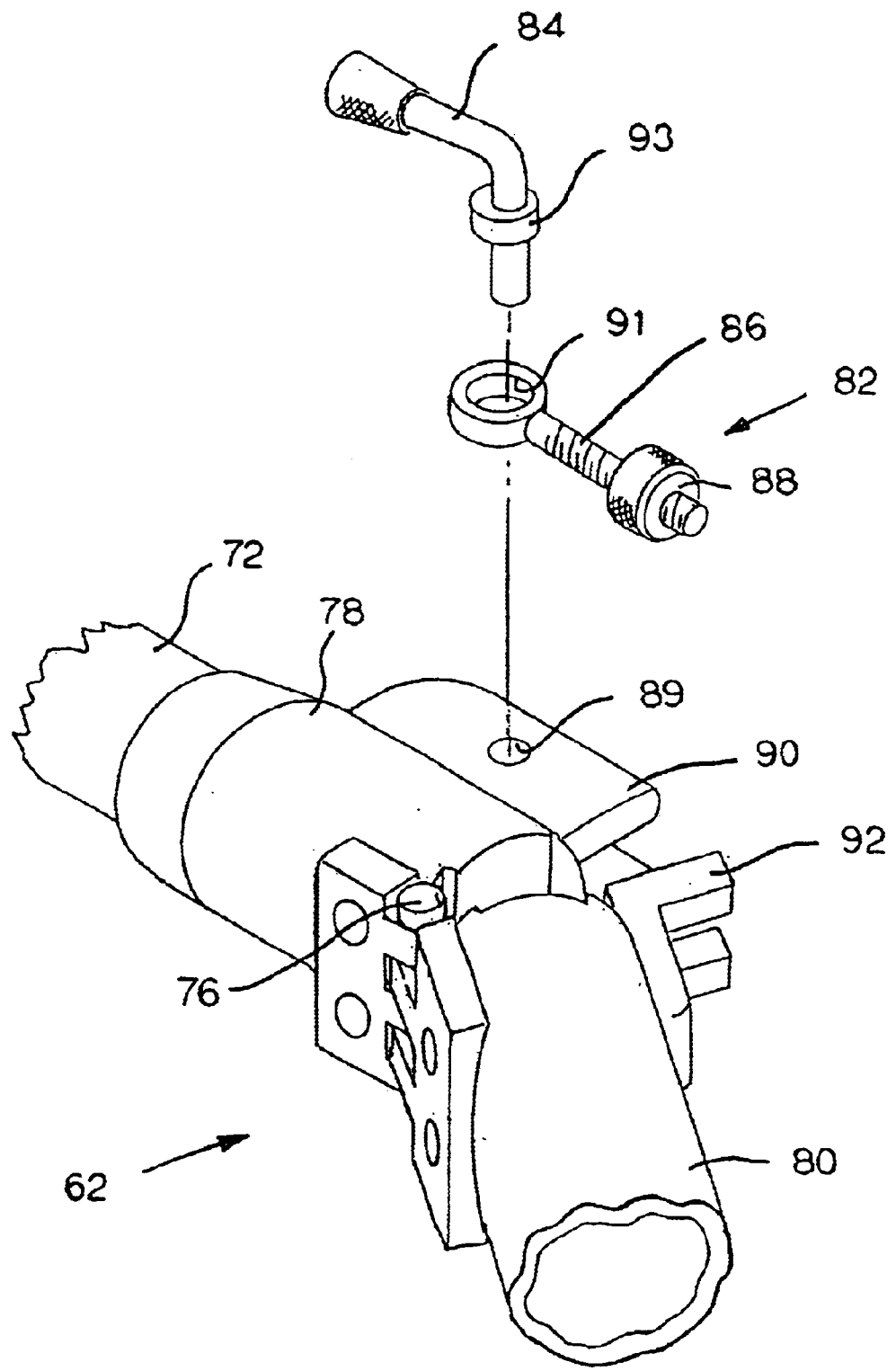
FIG. 9 is a perspective view of the unlatched joint of FIG. 8.

The front pivotal joint 62 includes left and right side sleeves 78, 80, which receive the free ends of the front top tube connector 72 and top bar 22, respectively. These free ends are secured (as by welding, for instance) to their respective sleeves 78, 80. As shown in FIG. 7, a latching mechanism 82, opposite the pivot hinge 76, permits quick release of the sleeves 78, 80 to allow the sleeves 78, 80 and their respective bicycle frame members 72, 22 to pivot along the pivot axis 76A of the pivot hinge 76. Referring to FIG. 9, the latching mechanism 82 includes a knurled lever arm 84, which is cam mounted for pivotal rotation to a rounded opening 91 at a first end of a threaded rod 86 and through holes 89 in a mounting base 90 fixed to the left side sleeve 78. A knurled nut 88 is threaded onto the second end of the threaded rod 86. The knurled nut 88 abuts a bifurcated projection 92 (See FIGS. 8 and 9) fixed to the right side sleeve 80 in order to hold the two sleeves 78, 80 together when the lever arm 84 is in axial alignment with the threaded rod 86 (as shown in FIG. 7). When the lever arm 84 is moved in a clockwise direction (as shown in phantom in FIG. 7), the action of the cam 93 (See FIG. 9) axially displaces the threaded rod 86 to the right, so that the knurled nut 88 may clear the bifurcated projection 92, swinging counterclockwise about the cam 93, so that the sleeves 78, 80 may be separated as they pivot about the pivot axis 76A of the pivot hinge 76. The knurled nut 88 may be adjusted by threading it onto the threaded rod 86 such that, when the lever arm 84 is once again axially aligned with threaded rod 86 so as to lock the front pivot joint 62, as seen in FIG. 7, the nut 88 presses down tightly on the bifurcated projection 92 for a secure clamping action.

The lower front pivotal joint 62A has a very similar configuration to the pivotal joint 62 just described, so that it can be locked in the planar position or released, allowing the front wheel to pivot out of the plane of the frame. When the upper and lower pivotal joints 62, 62A are released, the entire front wheel assembly, including the front wheel 46, front tire 50, front carrier rack 53, front fork tube 24, handle bar post 38, goose bar 40, and handle bars 42, is free to swivel counterclockwise (as seen from the vantage point of FIG. 3), to the position shown in FIG. 4, with the front wheel 46 out of the plane of the bicycle frame.

FIGS. 11, 12, 13 and 14 show the rear pivotal joint 64, which, when released, allows the entire rear wheel assembly, including the rear wheel 48, rear tire 52, rear carrier rack 55, seat 36, seat post 34, seat tube 28, top stay 30, chain stay 32, chain drive 58, bottom bracket 44, and rear top-tube connector 74 to swivel clockwise (as seen from the vantage point of FIG. 3), to the position shown in FIG. 4. In this preferred embodiment, the rear pivotal joint 64 includes an inner tube 94 within an outer tube 60, wherein the inner tube 94 swivels inside the outer tube 60, to allow the entire rear end of the bicycle 20 to swing around to the position shown in FIG. 4.

Figure 11:
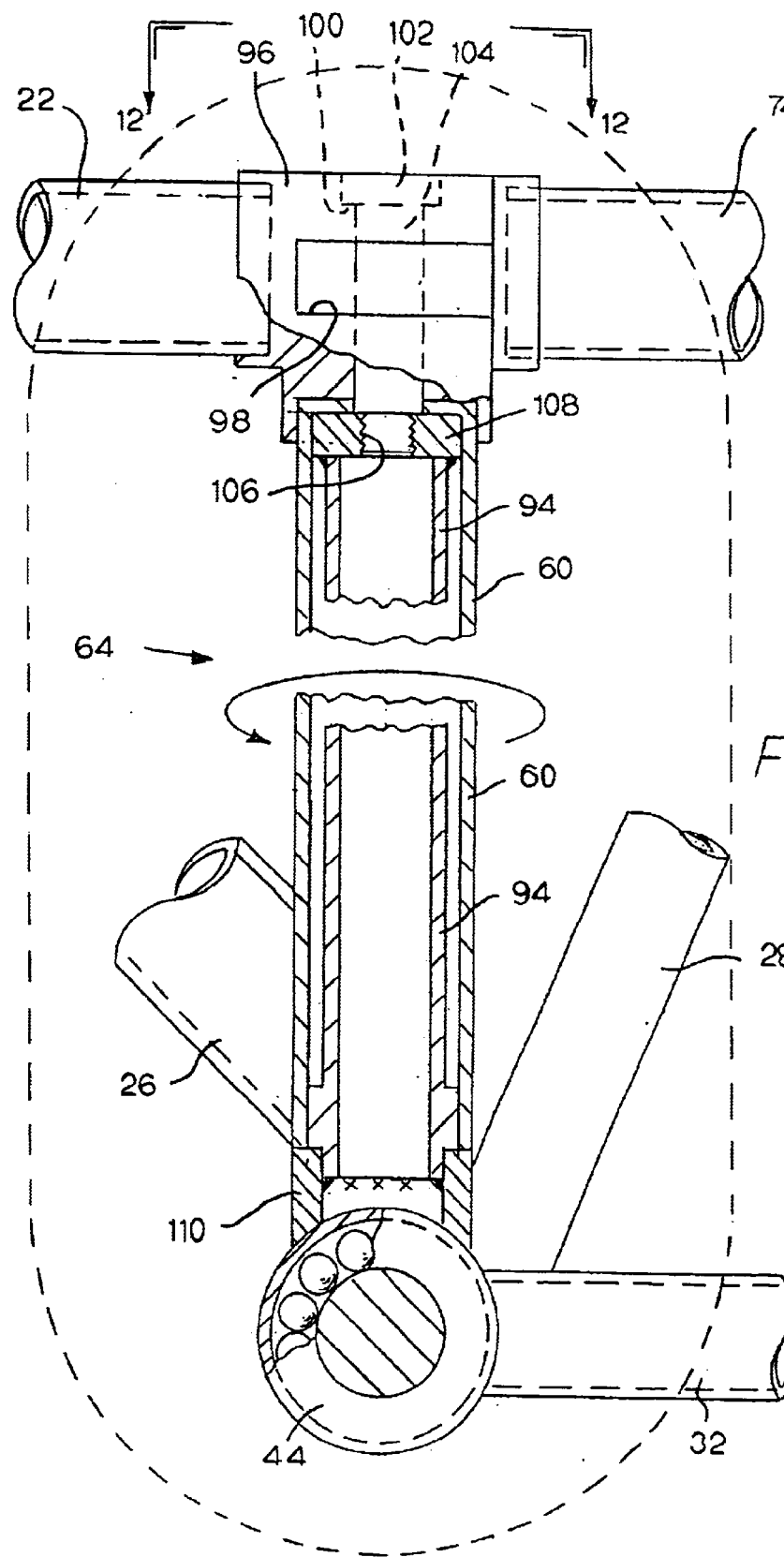
FIG. 11 is an enlarged, broken-away section view through the vertical swiveling tube of FIG. 1, showing detail of the rear hinge.
Figure 14:
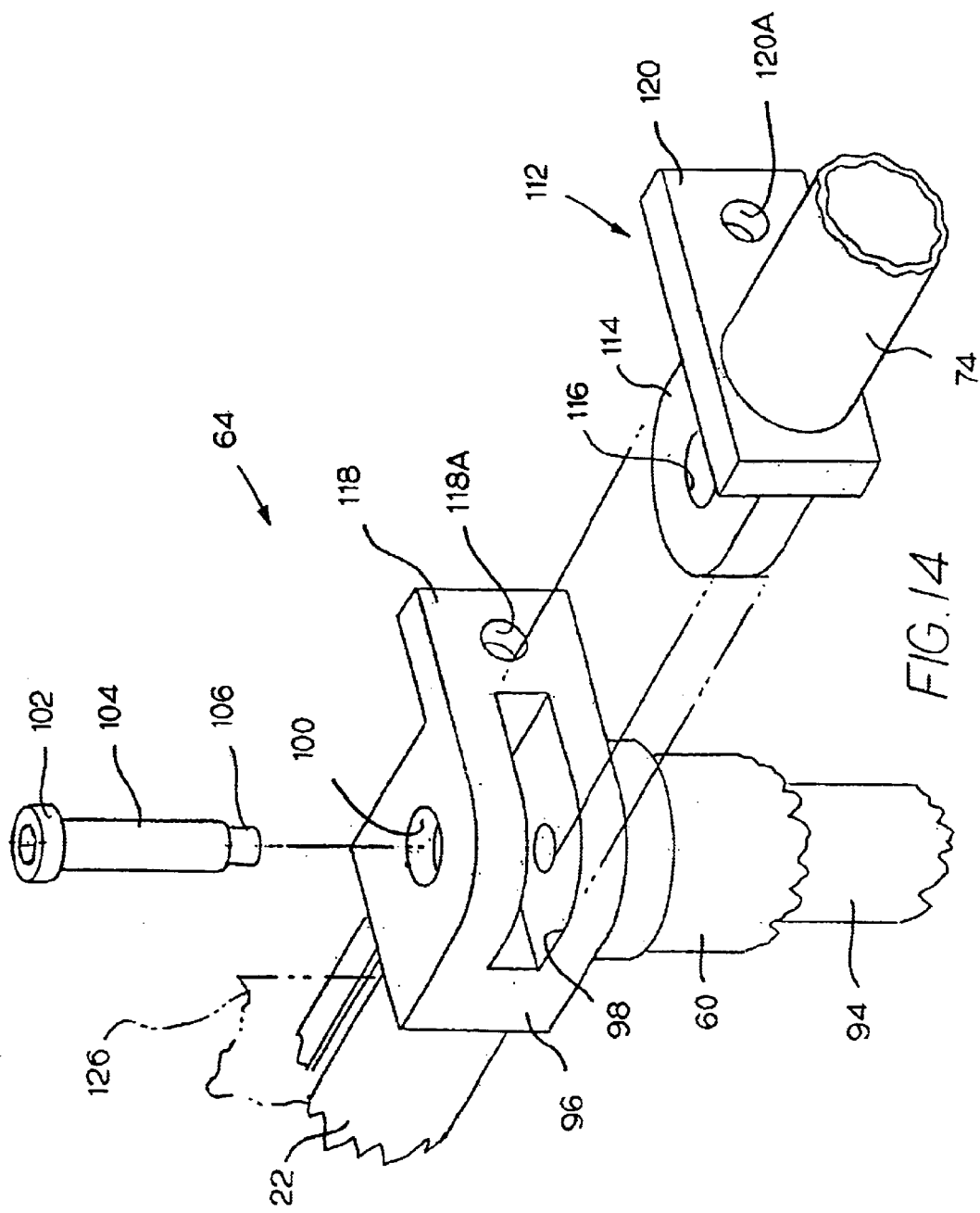
FIG. 14 is an exploded, perspective view of the hinge joint of FIG. 12.

FIGS. 11 and 14 show additional details of the rear pivotal joint 64. A sleeve 96 is fixed to the rear of the top bar 22 of the bicycle frame. A hole 100 extends vertically through the sleeve 96, defining the center of an imaginary circle. The sleeve defines a slotted cavity 98, with the slot extending along a quadrant (approximately ninety degrees) of the imaginary circle. The hole 100 is counterbored (as shown in FIG. 11) so that the head 102 of the pivot pin 104 rests in this counterbore. The pivot pin 104 defines a pivot axis and extends through the sleeve 96. The threaded end 106 of the pivot pin 104 threads onto a cap 108, which is secured, as by welding, to the top end of the inner tube 94 (See FIG. 11). The bottom end of the inner tube 94 is secured (as by welding) to a nub 110 on the bottom bracket 44, which is also secured to the seat tube 28 and to the chain stay 32 (as shown in FIG. 11). The upper end of the outer tube 60 is secured to the bottom of the sleeve 96, and the down tube 26 of the bicycle frame is secured to the lower end of the outer tube 60 (as shown in FIG. 11).

Figure 12:
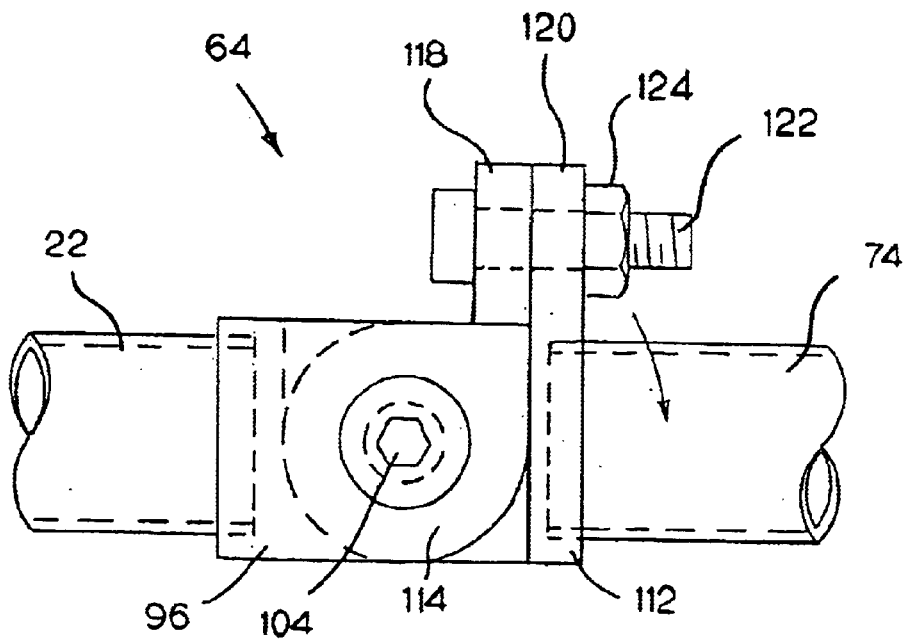
FIG. 12 is a view along line 12—12 of FIG. 11.
Figure 13:
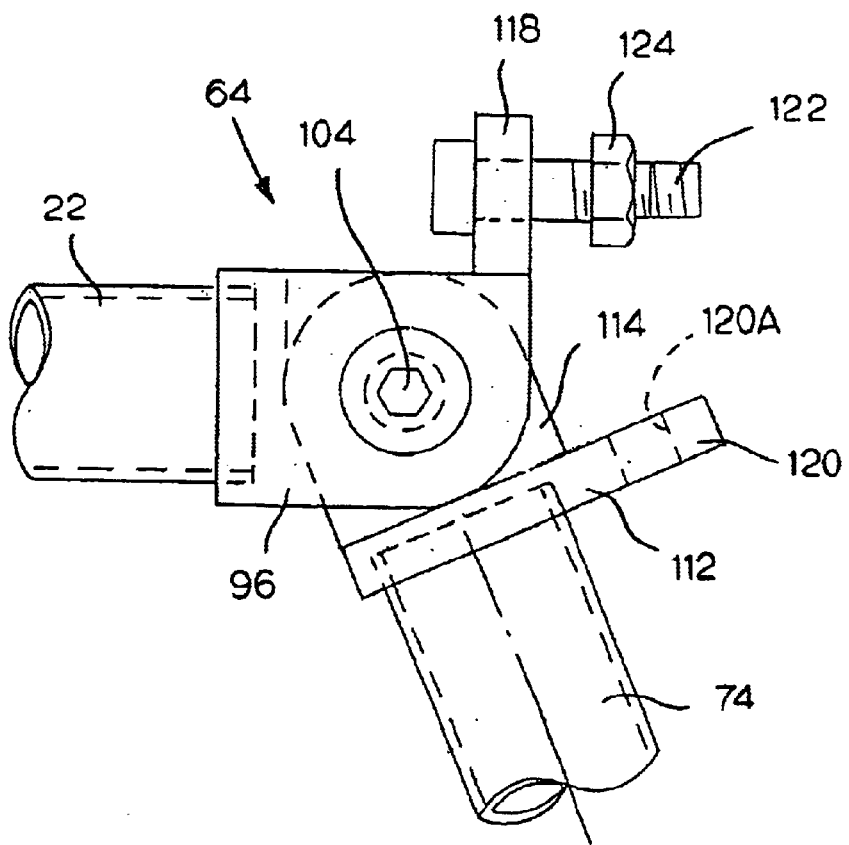
FIG. 13 is the same view as FIG. 12, but with the rear hinge rotated for the folding chair configuration.

As seen in FIG. 14, a rear pivotal joint insert 112, which is secured at its right end to the top tube connector 74, includes a semi-circular projection 114 with a hole 116 through the middle. When the rear pivotal joint insert 112 is assembled onto the rear pivotal joint 64, the semi-circular projection 114 slides inside the slotted cavity 98, and the pivot pin 104 extends through the hole 116 in the rear pivotal joint insert 112. Thus, the rear pivotal joint insert 112 is able to pivot relative to the sleeve 96 to the extent allowed by the slotted cavity 98. When the rear pivotal joint 64 is in the planar position, with the top bar 22 axially aligned with the rear top tube connector 74 (as shown in FIGS. 12 and 14), an arm extension 118 on the sleeve 96 mates up to a corresponding arm extension 120 on the rear pivotal joint insert 112, and their corresponding holes 118A, 120A align axially to allow a bolt 122 (See FIG. 12) to pass through the aligned holes 118A, 120A. The bolt 122 is secured by a nut 124 to releasably secure the sleeve 96 to the rear pivotal joint insert 112. Once the nut 124 is removed from the bolt 122, the rear pivotal joint insert 112 is free to pivot about the pivot pin 104, to the extent allowed by the slotted cavity 98. This latching mechanism for the rear pivotal joint 64, including the arm extensions 118, 120 with corresponding holes 118A, 120A, the bolt 122 and the nut 124 could be replaced by the same type of cam-action lever latching mechanism 82 found in the front pivotal joint 62.

As seen in FIG. 1, the rear top tube connector 74 is connected to the seat tube 28 and to the top stay 30 at a node 126. Since the seat tube 28 is secured to the bottom bracket 44, it is also secured to the inner tube 94 (See FIG. 11). So, when the rear pivotal joint 64 swivels relative to the sleeve 96, the entire rear wheel assembly of the bicycle 20 (including the rear tire 52, rear wheel 48, top stay 30 seat tube 28, chain stay 32, bottom bracket 44, cranks 54, and pedals 56) also swivels, along with the nub 110, the inner tube 94, and the top cap 108. The inner tube 94 and the top cap 108 swivel inside the outer tube 60.

FIG. 6A is a section view through the roller tube 66, which stores the rolled up chair fabric 126. The chair fabric 126 may be any flexible material, such as cloth, vinyl, woven metal, and so forth. Referring briefly to FIG. 1, the roller tube 66 holds the fabric 126 rolled up inside as seen in FIG. 6A. The deployed fabric 126 (See FIG. 4) is trapezoidal in shape, with the shorter of the parallel edges 128 affixed to the top bar 22, and the longer of the parallel edges secured to a bar 130 inside the roller tube 66. The bar 130 is coupled to a spring motor 131 (See FIG. 6), which acts to retract the fabric 126 into the roller tube 66 in much the same manner as a retractable window shade. The bar 130 is rotatably mounted inside the roller tube 66. Short tub shafts 144 extend beyond the ends of the roller tube 66, and these stub shafts 144 have end caps 146 of a larger diameter than that of the stub shafts 144. As is explained in more detail later, when the bicycle 20 is in the chair configuration (as shown in FIGS. 2 and 4), with the wheel assemblies pivoted out of the plane of the bicycle frame, the stub shafts 144 extend through the holes 132 at the ends of the spokes 134 of the wheels 46, 48, and the end caps 146 retain the stub shafts 144 in the holes 132, and the fabric 126 thus drapes between the two bars 22, 66 in a fashion akin to a hammock to form a sling chair (See FIG. 5).

Figure 2A:
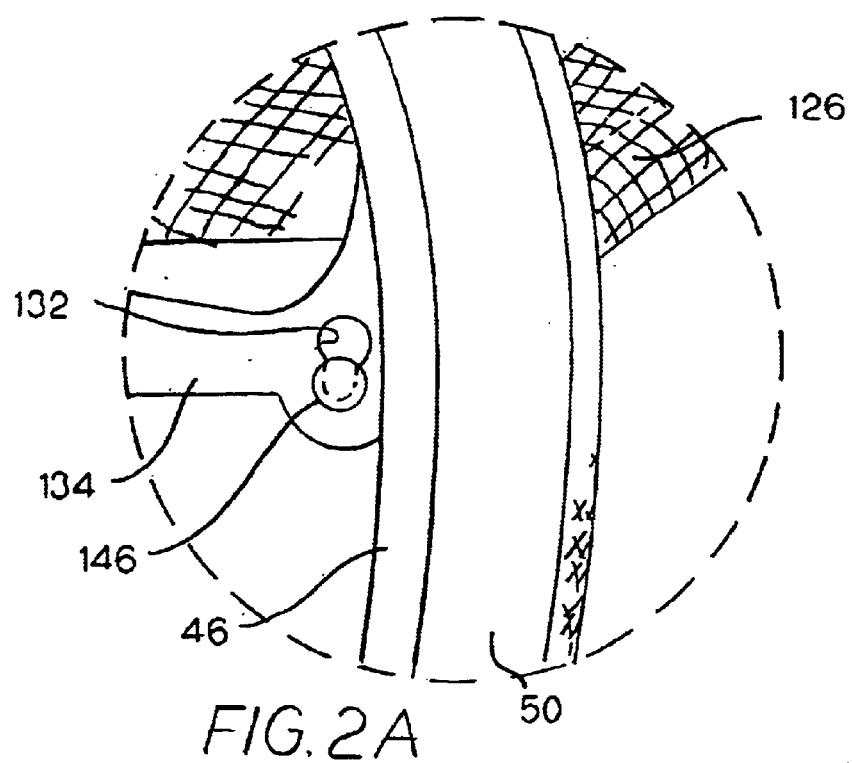
FIG. 2A is an enlarged view of area 2A in FIG. 2.
Figure 2B:
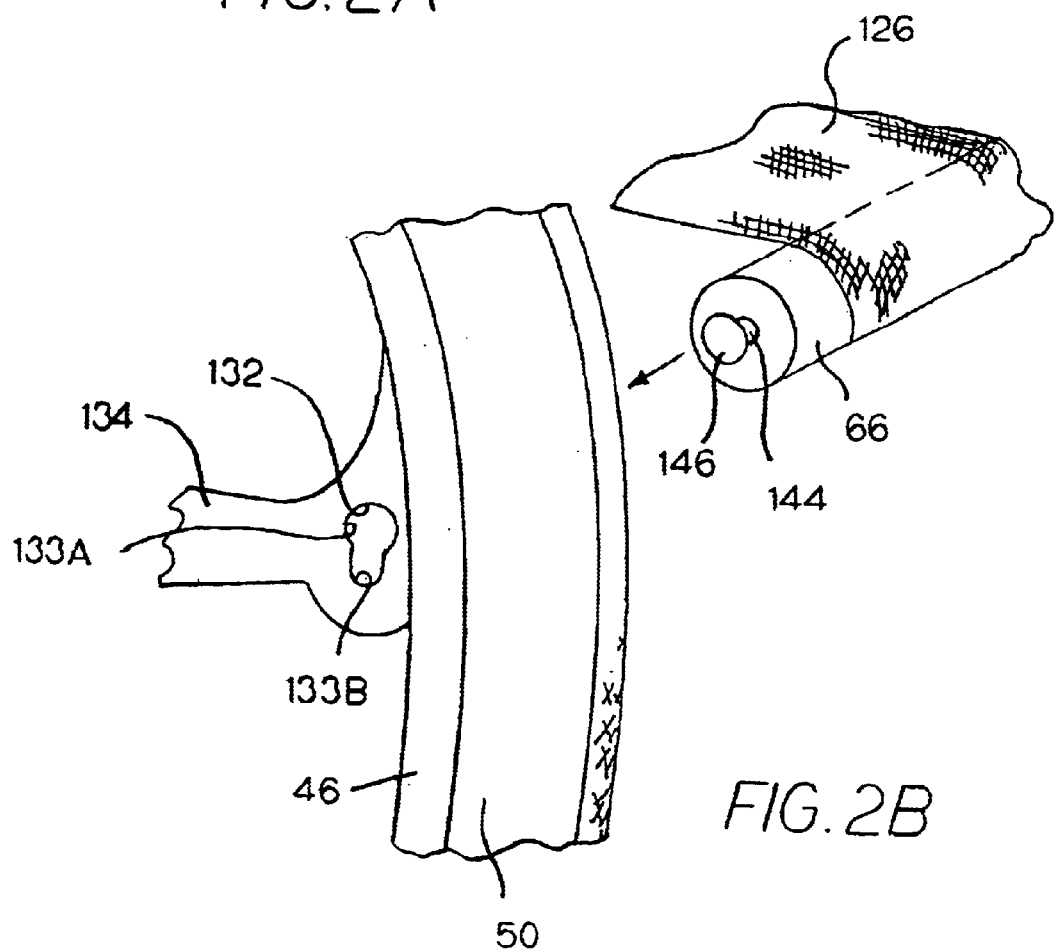
FIG. 2B is the same view as FIG. 2A but exploded.
Figure 8:
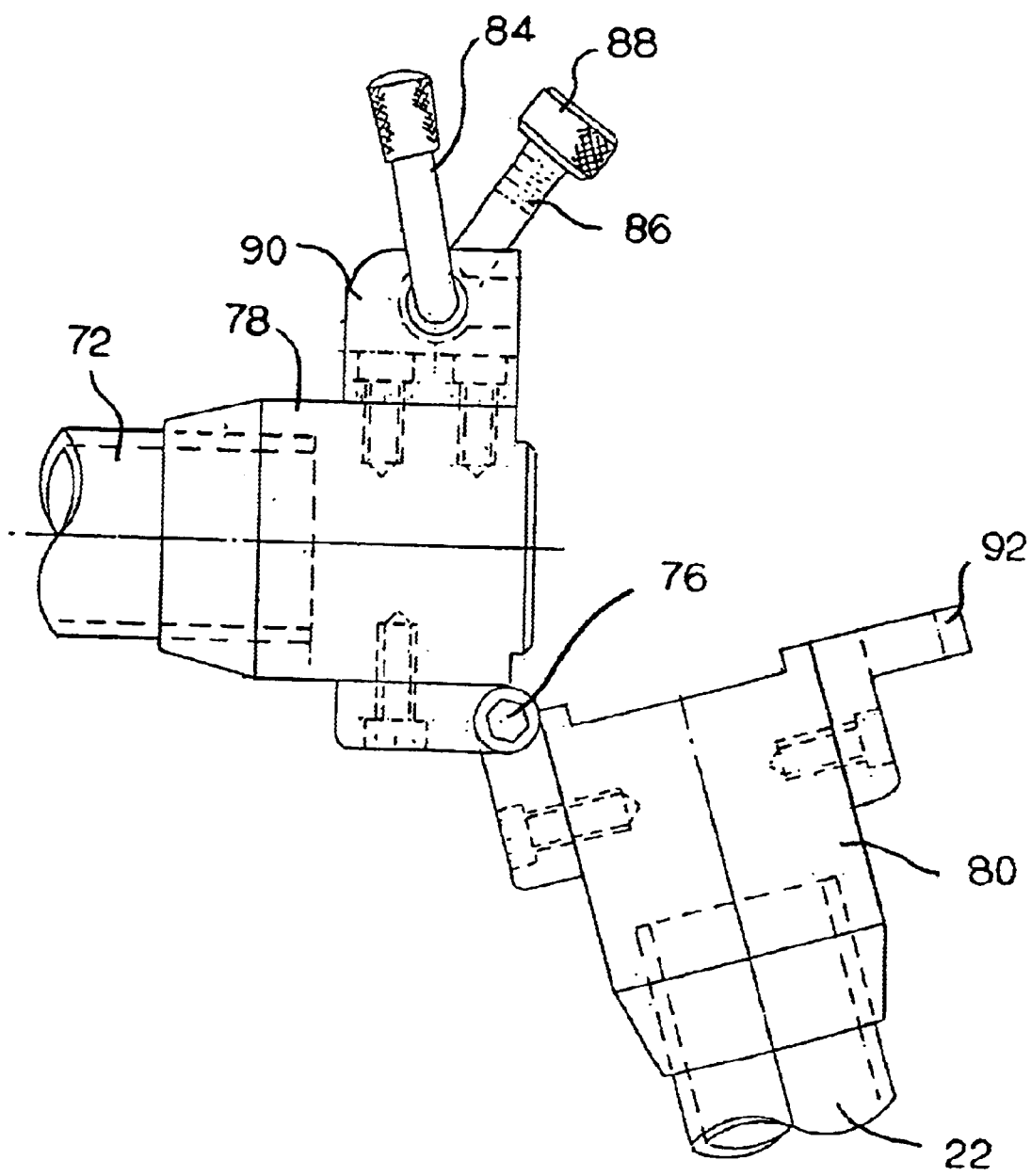
FIG. 8 is the same view as FIG. 7 except the hinge joint is unlatched and the hinge is open.
Figure 18:
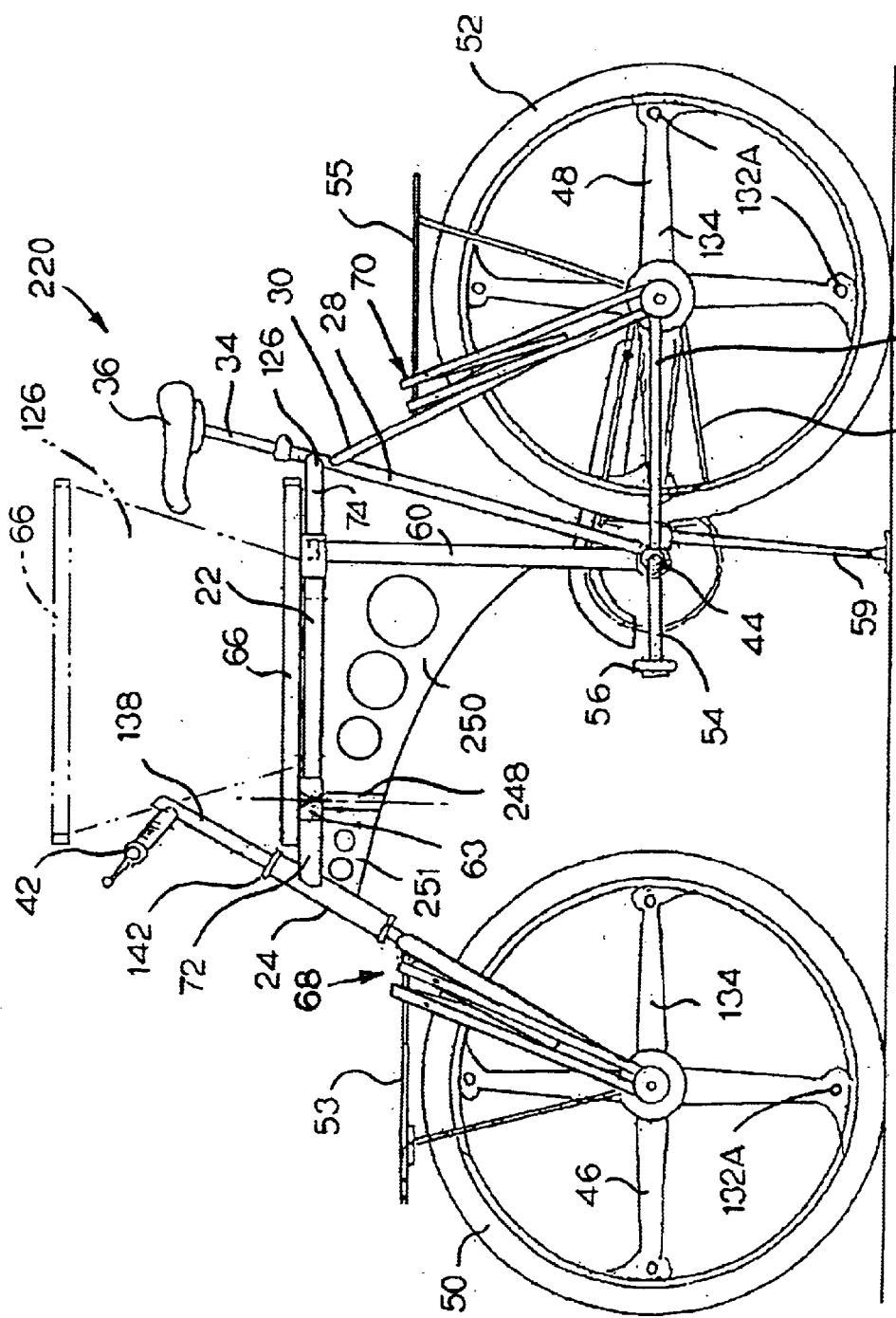
FIG. 18 is a side view, similar to FIG. 1, of a second embodiment of a bicycle made in accordance with the present invention.

FIGS. 2A and 2B provided an enlarged and detailed view of the mechanism for securing the roller tube 66 to the spokes 134 of the front wheel 46 of the bicycle 20 (the mechanism is identical for the rear wheel 48). The holes 132 on the spokes 134 are shaped like a keyhole (See FIG. 2B) with a rounded section 133A and a narrower slotted section 133B. The end cap 146 is inserted through rounded section 133A of the hole 132 until the stub shaft 144 is straddling the hole 132. Once the user releases the roller tube, gravity pulls it down so that the stub shaft 144 slides down into the narrower slotted section 133B, effectively locking the roller tube 66 in place, preventing the wheel 46 from pivoting along the front pivotal joint 62. To separate the roller tube 66 from the wheel 46, the user lifts the roller tube 66 just far enough to align the end cap 146 with the rounded section 133A of the hole 132, so that the end cap 146 may be pulled out from the hole 132. It is interesting to note that the hole 132 need not be shaped like a keyhole. In fact, as shown in FIG. 18, the hole 132A may be a simple round hole and the mechanism works in essentially the same manner. The end cap 146 goes through the hole 132A, and when the roller tube is released gravity pulls it down such that the end cap 146 is no longer aligned with the hole 132A, effectively locking the roller tube 66 in place.

Figure 15:
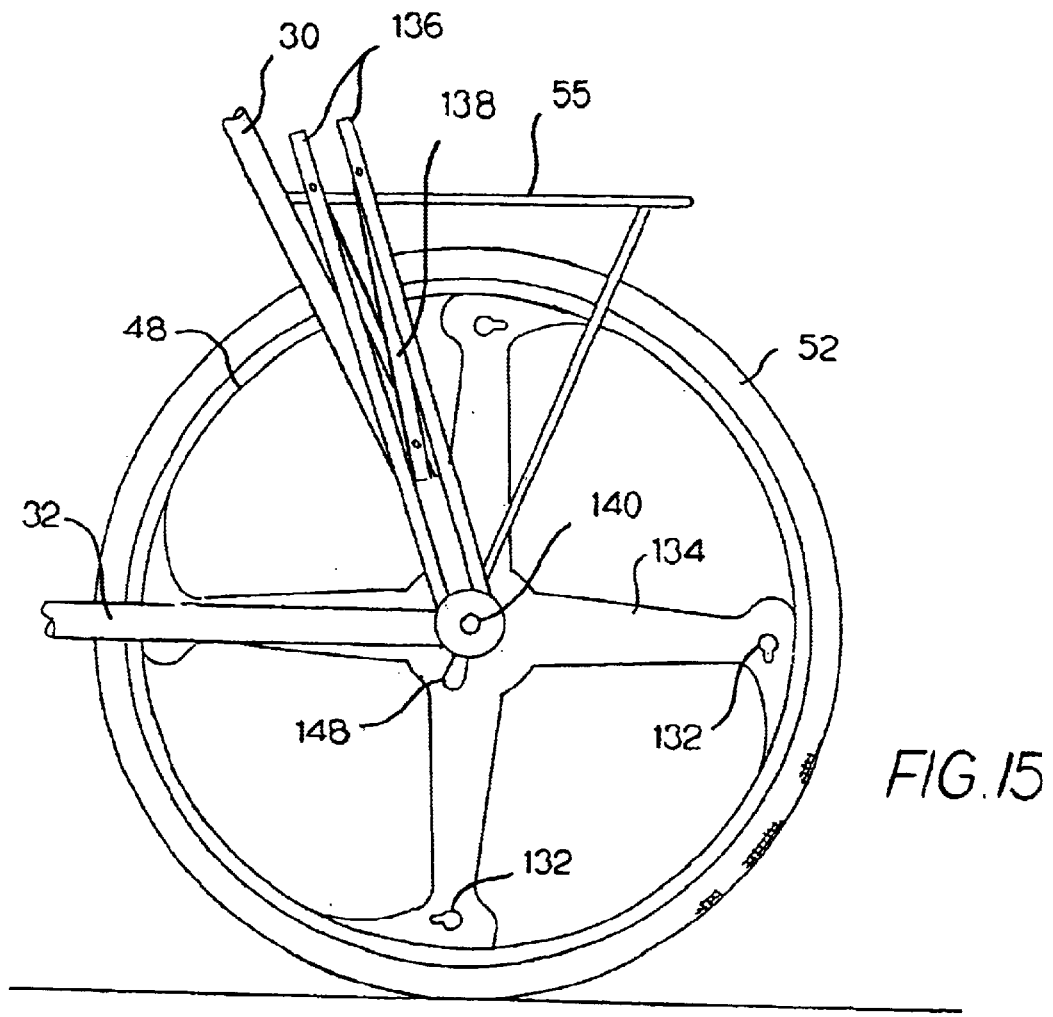
FIG. 15 is an enlarged, broken-away detail of the rear wheel assembly of FIG. 1, with the A-frame stand in the stowed position.
Figure 16:
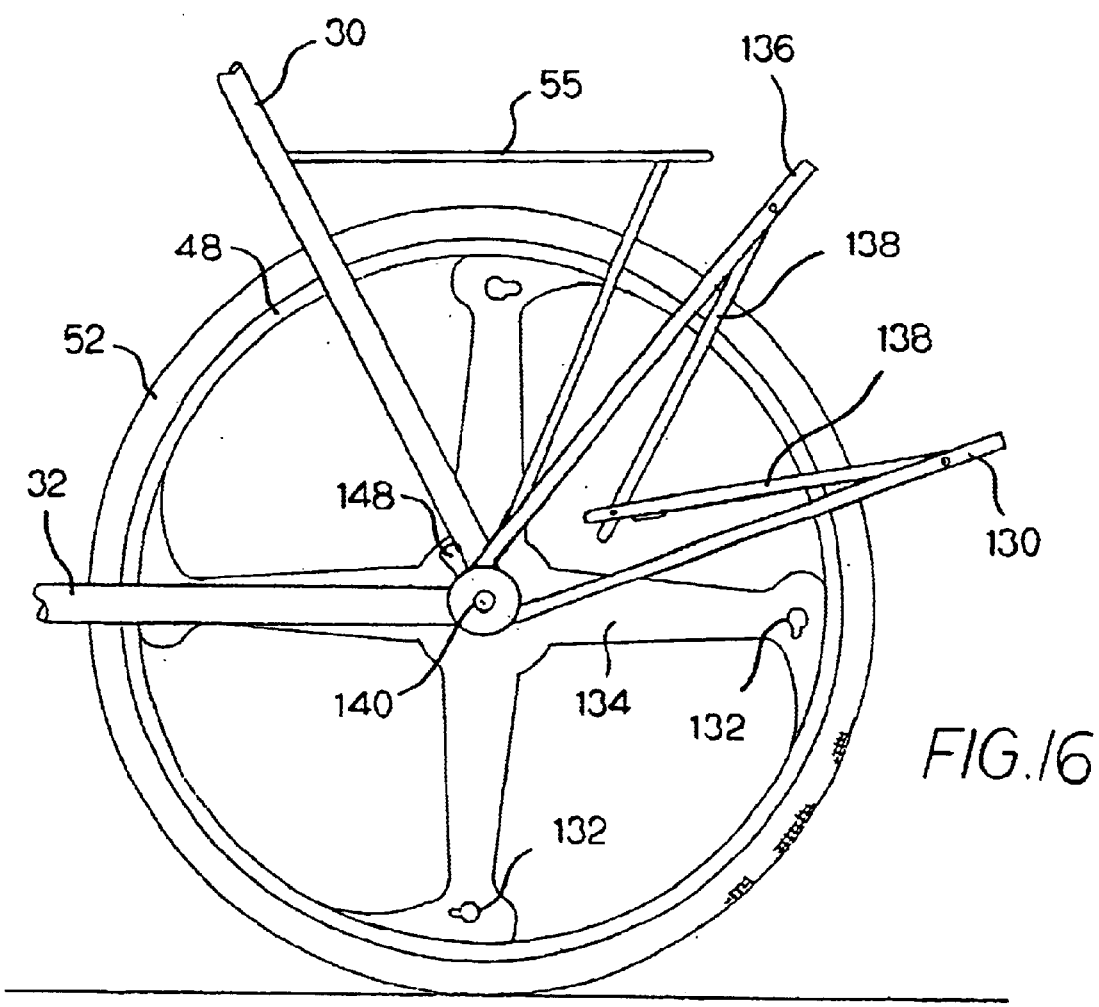
FIG. 16 is the same view as in FIG. 15, but with the A-frame stand in a partially deployed position.
Figure 17:
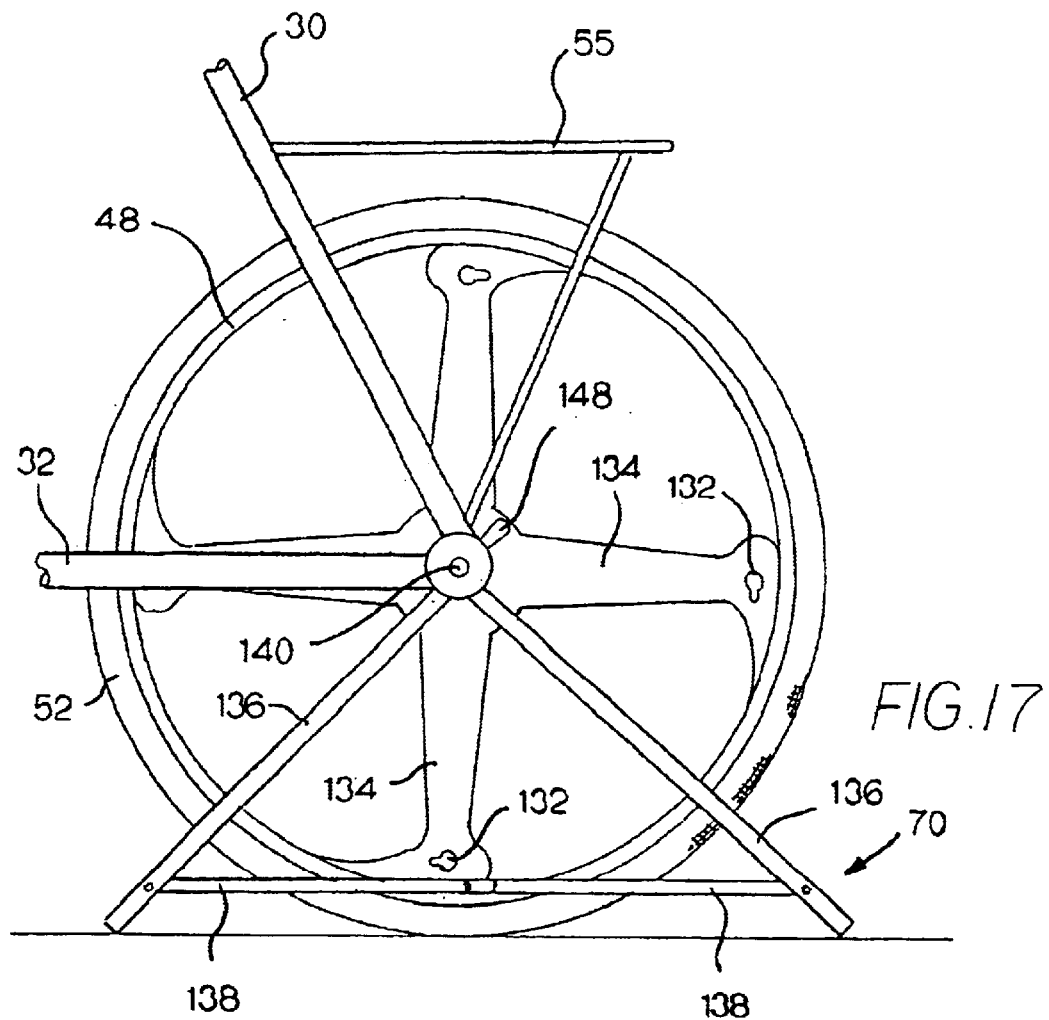
FIG. 17 is the same view as in FIG. 15, but with the A-frame stand in a fully deployed position.

FIGS. 15, 16, and 17 depict the rear wheel 48 of the bicycle 20, including the carrier rack 55 and the rear, retractable, A-frame stand 70. As may be appreciated from FIG. 16, the A-frame stand 70 includes two support legs 136 pivotably mounted at a first end for rotation about the wheel hub 140. These legs 136 are longer than the radius of the wheel 48, and, proximate the end opposite the first end, two "scissors legs" members 138 pivotably interconnect the support legs 136 and each other. The scissors legs 138 may be fully opened, as seen in FIG. 17, to form an A-frame support stand 70, wherein the support legs 136 rest on the ground (as seen in FIGS. 2 and 17) to create a stable platform for the chair. The scissors legs 138 may be fully collapsed, as shown in FIG. 15, and the support legs 138 pivoted around the wheel hub 140 to stow the A-frame stand 70 along side the top stay 30. The front wheel assembly 46 has an identical A-frame support stand 68 (See FIG. 2) which stows alongside the front fork tube 24. To stow or deploy these A-frames 68, 70, the lever 148 on the quick release hub 140 is moved to loosen the respective wheel, which then also allows the A-frames 68, 70 to be swung to the desired position. Once the lever 148 is returned to the closed and locked position of the quick release hub 140, the A-frames 68, 70 are also locked in place relative to the bicycle frame.

OPERATION OF THE BICYCLE CONVERSION TO A CHAIR

The bicycle 20 shown in FIG. 1 is readily converted to the chair 20A, shown in FIG. 2. To accomplish this conversion, the latch 82 of the front pivotal joint 62 is released by pulling on the lever arm 84 so as to axially displace the threaded rod 86 until the nut 88 may be slipped over the bifurcated projection 92. Once the latch 82 is released, the front pivotal joint 62 is free to allow rotation about the pivot hinge 76. A very similar mechanism is released at the lower front pivotal joint 62A, and this allows the entire front wheel assembly to pivot counterclockwise (as seen from the vantage point of FIG. 3) out of the plane of the frame 22 to the position shown in FIG. 4. Similarly, the rear pivotal joint 64 is released by removing the nut 124 and bolt 122. This joint 64 is now free to allow the entire rear wheel assembly to pivot along the inner tube 94, clockwise (as seen from the vantage point of FIG. 3) out of the plane of the frame 22 to the position shown in FIG. 4. The A-frame stands 68, 70 are deployed at each wheel 46, 48 by pulling the support legs 136 away from the carrier racks 53, 55, and separating these support legs 136 until the scissors legs 138 are fully open, and the support legs 136 are straddling the tires 50, 52 and are in contact with the ground. The roller tube 66 is pulled down and away from the top bar 22, deploying the fabric 126 coiled inside the roller tube 66 in order to form a sling chair. The end caps 146 of the roller tube 66 engage holes 132 at the ends of the spokes 134 of the wheels 46, 48. While it is engaged to the tires 46, 48, the roller tube 66 prevents the wheels 46, 48 from swiveling back toward the "bicycle" position, or from swiveling even further together toward each other. Thus, the roller tube 66 stabilizes the frame against further pivoting along the front and rear pivot joints 62, 62A, and 64, and the retractable A-frame stands 68, 70 serve as the legs of the chair 20A, preventing it from rolling back and forth like a two-wheeled wheelchair. As best shown in FIG. 5, the legs 136 of the A-frame stands 68, 70 extend far enough so that, when fully deployed, the ends of the legs 136 and the bottom of the tires 50, 52 are all in contact with the ground. The weight of the user sitting on the sling chair is transmitted, via the top tube 22 and the roller tube 66, to the frame and eventually to the tires 50, 52 and to the A-frames 68,70. This weight increases the force with which the tires 50, 52 are contacting the ground, increasing the friction between the tires 50, 52 and the ground, thus preventing the tires 50, 52 from rotating along their respective wheel shafts 140. Finally, a nut 142, located where the fork tube 24 meets the handle bar post 38 may be loosened to rotate the handle bars 42 so they are out of the way of the chair 20A user when the user is seated on the fabric 126. It is also possible to remove the seat post 34 and the seat 36, and replace these with an umbrella (not shown) to provide protection against the elements to the user of the chair 20A. It is possible to releasably secure the goose bar 40 to the handle bar post 38, and the seat post 34 to the seat tube by means of lever action quick release mechanisms, which are well known in the industry for such purposes.

The chair 20A may be readily converted back into a bicycle by reversing the aforementioned steps. Namely, the roller tube 66 is lifted just far enough for the end caps 146 to align with the rounded portion 133A of the holes 132 so the spokes 134 may be disengaged from the roller tube. The spring motor 131 acts to retract the chair fabric 126 back around the rod 130 and inside the roller tube 66 as the roller tube is replaced upon its bracket atop the top tube 22. The retractable A-frames 68, 70 are collapsed and pivoted along the wheel hubs 140 (by loosening the quick release hubs 140) until they snap back against their respective front and rear wheel forks, and the quick release hubs 140 are once again tightened. The wheel assemblies are brought back into coplanar alignment with the bicycle frame and with each other by pivoting them around their respective front and rear pivotal joints 62, 62A, and 64, and these pivotal joints 62, 62A, and 64 are locked in place using their respective latching mechanisms. Finally, the handle bars 42 are properly repositioned, and the nut 142 is tightened to secure the handle bars 42 to the fork tube 24.

Figure 21:
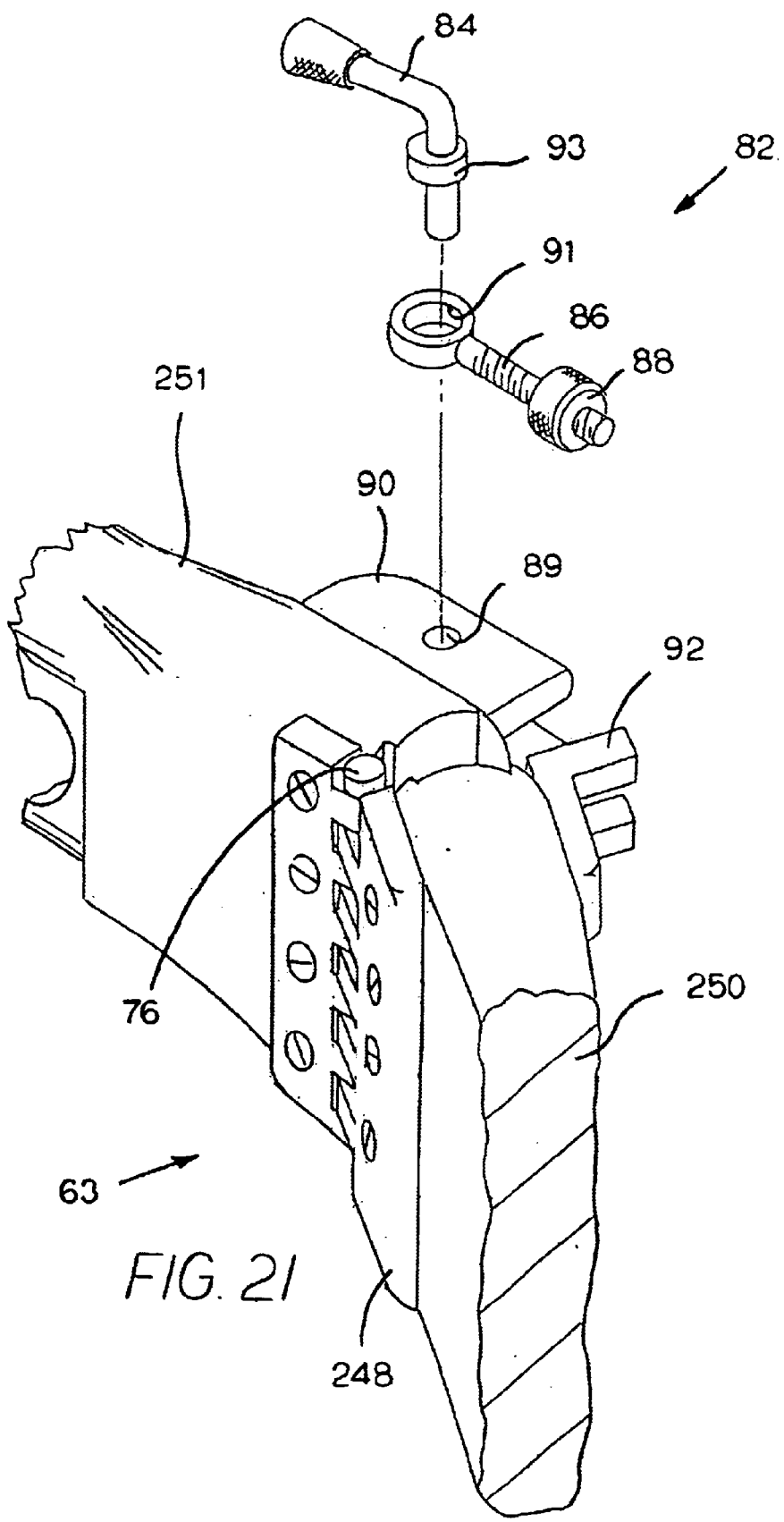
FIG. 21 is a perspective view of the front pivotal hinge of FIG. 18.

FIG. 18 depicts an alternate embodiment of a bicycle 220 manufactured in accordance with the present invention. This bicycle 220 is identical in practically every way to the previous embodiment 20, except that it does not have a down tube 26, and structural integrity is aided by the use of body planking 250, 251 and a modified front pivotal joint 63 (See FIG. 21). Since the down tube 26 is no longer present, the lower front pivotal joint 62A is also no longer required, and the conversion from a bicycle 220 to a chair 20A is a bit simpler and faster. As may be appreciated from a comparison of FIGS. 9 and 21, the front pivotal joints 62 and 63 respectively are very similar, sharing common components in the latching mechanism 82 area, and differing in that the hinge 248 (See FIG. 21) is a longer hinge 248, extending the full length of the body planking 250, 251 to provide greater rigidity and joint integrity in order to compensate for the absence of the down tube 26. The other aspects of this bicycle 220 are identical to that of the previous embodiment 20.

Figure 19:
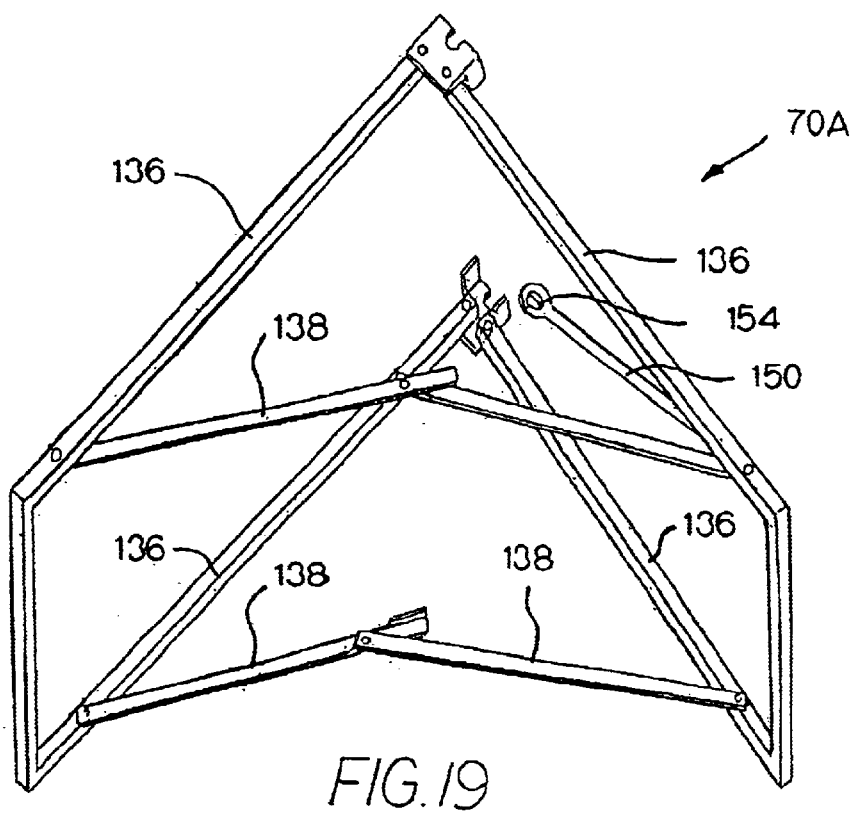
FIG. 19 is a perspective view of an alternate embodiment of the A-frame of 17.
Figure 20:
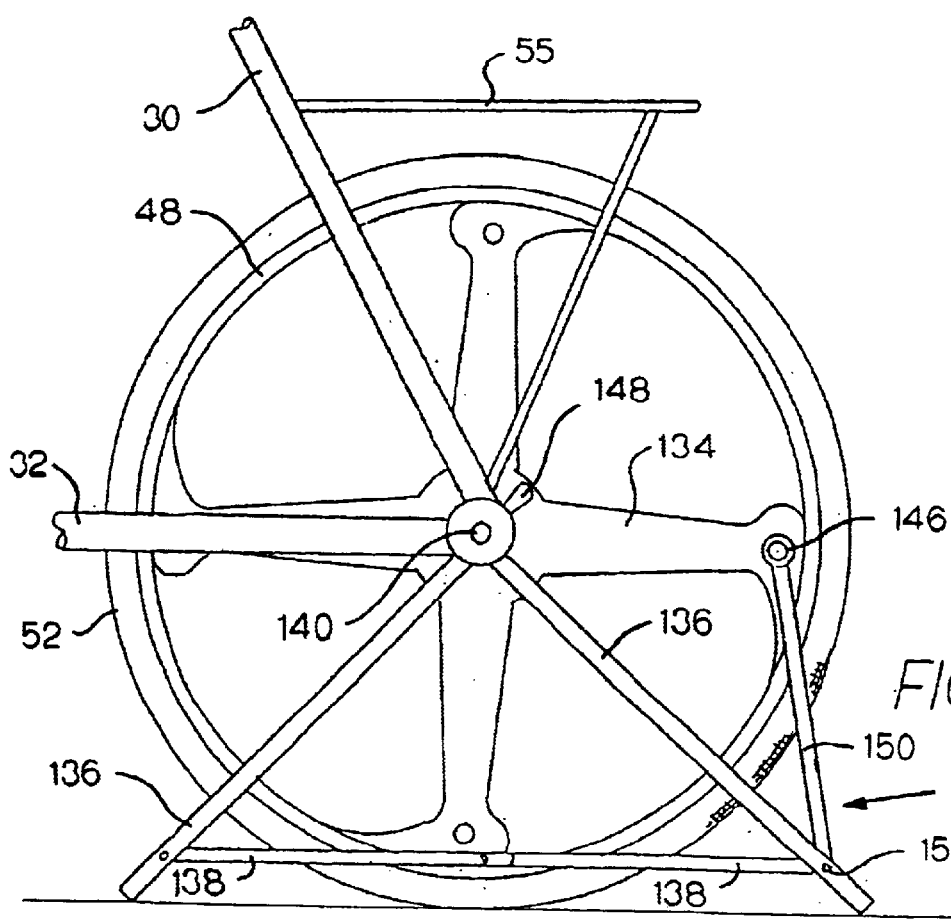
FIG. 20 is the same view as in FIG. 17, but with the alternate embodiment of the A-frame of FIG. 19.

FIGS. 19 and 20 depict an alternate embodiment of an A-frame 70A, similar to the A-frame 70 depicted in FIG. 17. The only difference is that this new A-frame 70A includes an outrigger member 150 which, at one of its ends pivots about a point 152 which also coincides with the pivot point of one of the scissors legs 138. The opposite end of the outrigger member 150 includes a circular opening 154. The length of the outrigger member 150 is such that, when the A-frame 70A is fully deployed, the circular opening 154 in the outrigger member 150 lines up with the hole 132 (See FIG.

17) in the spoke 134 of the wheel 48 when the spoke 134 on which the hole 132 is located is aligned horizontally. This is also the hole 132 through which the end cap 146 on the stub shaft 144 of the roller tube 66 (See FIG. 2B) extends in order to lock the roller tube 66 onto the wheel 46, as was explained earlier. This same end cap 146 serves to also lock the outrigger member 150 in place. The outrigger member 150, thus locked in place prevents wheel 48 rotation about the hub 140 even when the user applies a downward force on the roller tube 66 before, during, or after the action of sifting on the chair 20A.

The embodiments described above are intended to be examples of bicycles made in accordance with the present invention. It will be obvious to those skilled in the art that modifications may be made to the embodiments described above without departing from the scope of the invention as claimed.

What is claimed is:

1. A bicycle which is convertible from a riding configuration to a chair configuration, comprising:
    a front wheel assembly;
    a rear wheel assembly;
    a frame interconnecting said front and rear wheel assemblies such that said wheel assemblies are in coplanar arrangement when said bicycle is in its riding configuration; and
    front and rear pivotal joints on said frame which allow said front and rear wheel assemblies to pivot out of said coplanar arrangement to form a substantially U-shaped framework for supporting a sling chair;
    a roller tube parallel to said frame; and
    a sheet of fabric secured at one end to said frame and at the other end to said roller tube, wherein said fabric is rolled up within said roller tube for storage and unwinds from said roller tube and is supported on said substantially U-shaped framework to form a sling chair.

2. A bicycle as recited in claim 1, and further comprising a spring for retracting said fabric into said roller tube.

3. A bicycle as recited in claimed 2, wherein said spring comprises a spring motor mounted to a rod rotatably supported inside said roller tube; said other end of said fabric is secured to said rod; and said spring motor is mounted so as to rotate said rod relative to said roller tube so as to wrap said fabric around said rod inside said roller tube.

4. A bicycle as recited in claim 3, wherein said roller tube has first and second ends, at least one of said ends including a stub shaft and an end cap, wherein said roller tube ends are releasably mounted onto said front and rear wheel assemblies when said bicycle is in a chair configuration.

5. A bicycle which is convertible from a riding configuration to a chair configuration, comprising:
    a front wheel assembly;
    a rear wheel assembly:
    a frame interconnecting said front and rear wheel assemblies such that said wheel assemblies are in coplanar arrangement when said bicycle is in its riding configuration; and
    front and rear pivotal joints on said frame which allow said front and rear wheel assemblies to pivot out of said coplanar arrangement to form a substantially U-shaped framework for supporting a sling chair, wherein said front pivotal joint includes a locking mechanism, comprising;
        a cam;
        a lever eccentrically mounted onto said cam; and
        a rod pivotably attached to said cam, wherein, when said lever is in a first position, said cam acts on said rod to tighten and lock said front pivotal joint, and, when said lever is in a second position, said cam acts on said rod to loosen and release said front pivotal joint.

6. A bicycle which is convertible from a riding configuration to a chair configuration, comprising:
    a front wheel assembly;
    a rear wheel assembly;
    a frame interconnecting said front and rear wheel assemblies such that said wheel assemblies are in coplanar arrangement when said bicycle is in its riding configuration; and
    front and rear pivotal joints on said frame which allow said front and rear wheel assemblies to pivot out of said coplanar arrangement to form a substantially U-shaped framework for supporting a sling chair, wherein said rear pivotal joint comprises:
        an outer tube affixed to one of said frame and said rear wheel assembly; and
        an inner tube affixed to the other of said frame and said rear wheel assembly; and
        wherein said inner tube is pivotably mounted inside said outer tube.

7. A bicycle which is convertible from a riding configuration to a chair configuration, comprising:
    a front wheel assembly;
    rear wheel assembly;
    a frame interconnecting said front and rear wheel assemblies such that said wheel assemblies are in coplanar arrangement when said bicycle is in its riding configuration; and
    front and rear pivotal joints on said frame which allow said front and rear wheel assemblies to pivot out of said coplanar arrangement to form a substantially U-shaped framework for supporting a sling chair, and further comprising retractable stands mounted on said front and rear wheel assemblies.

8. A bicycle as recited in claim 7, wherein said retractable stands are A-frames which are movable between a first stowed position and a second deployed position.

9. A bicycle as recited in claim 8, wherein when said A-frames are in said stowed position they are collapsed, and when they are in said deployed position they are extended and interconnected by scissors legs.

10. A bicycle as recited in claim 9, further comprising:
    front and rear wheels pivotably mounted for rotation about respective front and rear wheels hubs of said front and rear wheels assemblies respectively; and
    wherein each of said A-frames further comprise at least one outrigger member acting to prevent rotation of said front and rear wheels about said front and rear wheel hubs.

11. A bicycle as recited in claim 7, and further comprising handlebars connected to said front wheel assembly, wherein said handlebars may be rotated from a first position, substantially perpendicular to said frame, to a second position substantially coplanar with said front wheel assembly.

* * * * *

UNITED STATES PATENT AND TRADEMARK OFFICE
CERTIFICATE OF CORRECTION

PATENT NO. : 6,688,627 B1
DATED : February 10, 2004
INVENTOR(S) : Ruowei Z. T. Strange It is certified that error appears in the above-identified patent and that said Letters Patent is hereby corrected as shown below:

<u>Column 7,</u>
Line 10, delete "sifting" and insert therefor -- sitting --.

<u>Column 8,</u>
Line 32, insert -- a -- at the beginning of the line.

Signed and Sealed this

Fifteenth Day of June, 2004

JON W. DUDAS
*Acting Director of the United States Patent and Trademark Office*